United States Patent [19]
Katagiri et al.

[11] Patent Number: 5,898,550
[45] Date of Patent: Apr. 27, 1999

[54] MAGNETIC TAPE CASSETTE

[75] Inventors: Shingo Katagiri; Shoji Suzuki; Yukiyoshi Ishii, all of Kanagawa-ken, Japan

[73] Assignee: Fuji Photo Film Co., Ltd., Kanagawa, Japan

[21] Appl. No.: 08/977,050

[22] Filed: Nov. 25, 1997

Related U.S. Application Data

[63] Continuation of application No. 08/565,908, Dec. 1, 1995, abandoned, which is a continuation of application No. 08/295,043, Aug. 26, 1994, Pat. No. 5,530,610, which is a continuation of application No. 08/015,596, Feb. 10, 1993, abandoned.

[30] Foreign Application Priority Data

May 6, 1992 [JP] Japan ................ 4-029387 U

[51] Int. Cl.$^6$ ................................... G11B 23/02
[52] U.S. Cl. ............................................. 360/132
[58] Field of Search ............................ 360/132; 264/250, 264/255; 242/347

[56] References Cited

U.S. PATENT DOCUMENTS

| | | | |
|---|---|---|---|
| 4,706,149 | 11/1987 | Machida et al. | 360/132 |
| 4,802,045 | 1/1989 | Yamamoto et al. | 360/132 |
| 5,189,583 | 2/1993 | Okamura et al. | 360/132 |

FOREIGN PATENT DOCUMENTS

| | | | |
|---|---|---|---|
| 2-76376 | 6/1990 | Japan . | |
| 2195583 | 8/1990 | Japan . | |
| 3292692 | 12/1991 | Japan | 360/132 |
| 4-98668 | 3/1992 | Japan | 360/137 |

Primary Examiner—Allen Cao
Attorney, Agent, or Firm—Sughrue, Mion, Zinn, Macpeak & Seas, PLLC

[57] ABSTRACT

A magnetic tape cassette comprises an approximately rectangular bottom wall provided with an opening, into which a spindle is to be inserted, a side wall extending along the periphery of the bottom wall, and a structural part formed integrally with the bottom wall at a corner of the bottom wall and in proximity to the side wall. The magnetic tape cassette is of a thin-walled type, constituted of a resin, and integrally molded by feeding the resin from a position corresponding to the vicinity of a center point of the bottom wall into a mold. The bottom wall is provided with a flow path-like, thick-walled portion extending along a direction heading from the position in the bottom wall corresponding to the position, from which the resin is fed into the mold, approximately towards the structural part.

4 Claims, 3 Drawing Sheets

MAGNETIC TAPE CASSETTE

This is a Continuation of parent application Ser. No. 08/565,908 filed Dec. 1, 1995 now abandoned, which is a continuation of grandparent application Ser. No. 08/295,043 filed on Aug. 26, 1994 U.S. Pat. No. 5,530,610, which is a continuation of great-grandparent application Ser. No. 08/015,596 filed on Feb. 10, 1993, now abandoned.

BACKGROUND OF THE INVENTION

1. Field of the Invention

This invention relates to a magnetic tape cassette. This invention particularly relates to a magnetic tape cassette, which is constituted of a resin and is of a thin-walled type.

2. Description of the Prior Art

Magnetic tape cassettes accommodate hubs, around which magnetic tapes are wound. A magnetic tape cassette has an approximately rectangular bottom wall and a side wall extending along the periphery of the bottom wall. The magnetic tape cassette is integrally molded by feeding a resin from a position corresponding to the vicinity of the center point of the bottom wall into a mold. The bottom wall of the magnetic tape cassette is provided with openings, into which the spindles for rotating the hubs are to be inserted. Also, structural parts for constituting spaces, in which a lock member of a guard panel, and the like, are to be accommodated, are formed at corners of the bottom wall and in proximity to the side wall.

Recently, environmental destruction occurs due to waste plastic materials, or the like. Therefore, for the purposes of reducing the amounts of plastic materials used such that the amounts of waste plastic materials may become small, the thicknesses of magnetic tape cassettes have heretofore been made as small as possible. Specifically, the thicknesses of the bottom wall and the side wall of the magnetic tape cassette, which were approximately 2 mm in the past, are reduced to a range of approximately 1.2 to 1.5 mm.

The amount of the material used can be reduced by making the thicknesses of the bottom wall and the side wall of the magnetic tape cassette small. However, if the thicknesses of the bottom wall and the side wall of the magnetic tape cassette are made small, a resin having been fed into a mold for forming the magnetic tape cassette cannot flow smoothly through the flow path in the mold and will harden before it spreads throughout the mold. Accordingly, the flow path for the resin will be clogged, and the resin is not sufficiently filled in the aforesaid structural parts. Such phenomenon is referred to as "short shot." As a result, a defective magnetic tape cassette is obtained from the molding process.

SUMMARY OF THE INVENTION

The primary object of the present invention is to provide a magnetic tape cassette, which does not suffer from short shot.

The present invention provides a magnetic tape cassette comprising an approximately rectangular bottom wall provided with an opening, into which a spindle is to be inserted, a side wall extending along the periphery of the bottom wall, and a structural part formed integrally with the bottom wall at a corner of the bottom wall and in proximity to the side wall, the magnetic tape cassette being of a thin-walled type, constituted of a resin, and integrally molded by feeding the resin from a position corresponding to the vicinity of a center point of the bottom wall into a mold, wherein the bottom wall is provided with a flow path-like, thick-walled portion extending along a direction heading from the position in the bottom wall corresponding to the position, from which the resin is fed into the mold, approximately towards the structural part.

The term "structural part" as used herein means a portion forming a space, in which a lock member of a guard panel, is to be accommodated, a portion located at a corner of the bottom wall for the purposes of keeping the strength of the magnetic tape cassette, or the like.

With the magnetic tape cassette in accordance with the present invention, the bottom wall of the magnetic tape cassette is provided with the flow path-like, thick-walled portion extending along the direction heading from the position in the bottom wall corresponding to the position, from which the resin is fed into the mold, approximately towards the structural part. When the magnetic tape cassette is made with a molding process, the resin having been fed from a gate of the mold can smoothly pass through a space corresponding to the thick-walled portion to the positions at which the structural part is to be formed. Therefore, even if the magnetic tape cassette is of the thin-walled type, the resin can be reliably filled at the position in the mold corresponding to the structural part. Accordingly, the amount of the resin required can be reduced, and defects in the magnetic tape cassette due to short shot can be eliminated.

DESCRIPTION OF THE PREFERRED EMBODIMENTS

The present invention will hereinbelow be described in further detail with reference to the accompanying drawings.

Figure 1:
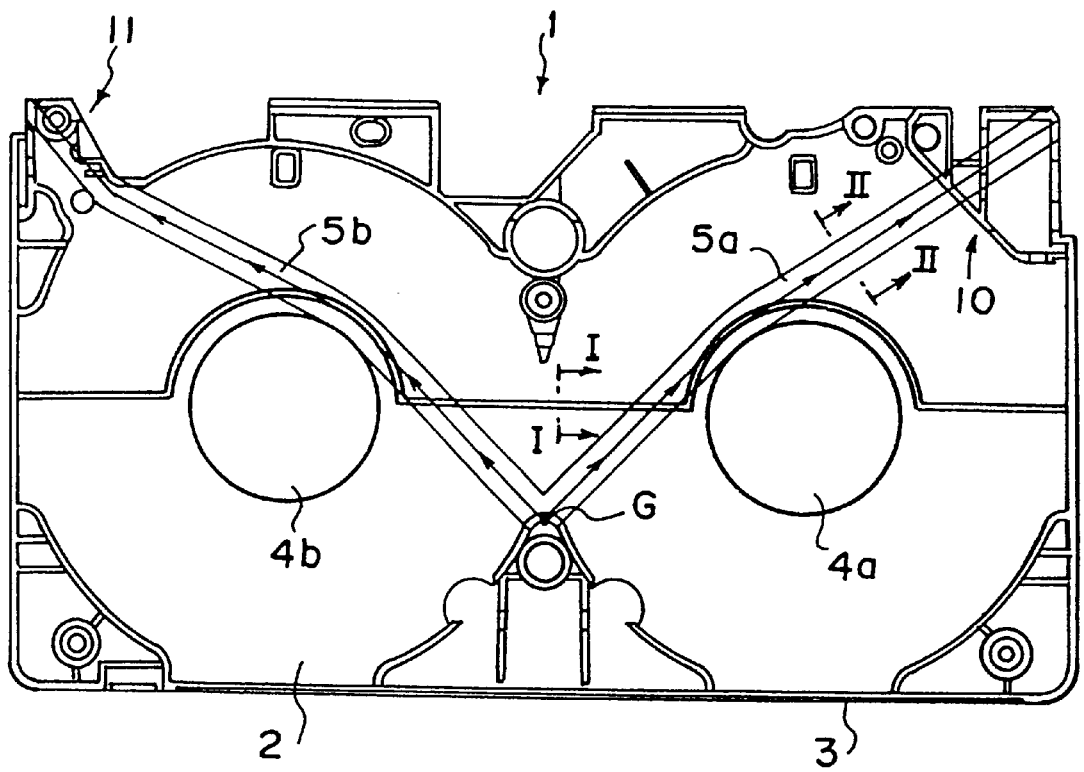
FIG. 1 is a plan view showing a first embodiment of the magnetic tape cassette in accordance with the present invention with its upper case being removed.

FIG. 1 is a plan view showing a first embodiment of the magnetic tape cassette in accordance with the present invention with its upper case being removed. With reference to FIG. 1, a magnetic tape cassette 1 for a VTR comprises an approximately rectangular bottom wall 2 and a side wall 3 extending along the periphery of the bottom wall 2. The bottom wall 2 is provided with an opening 4a, into which a spindle on the tape take-up side (T side) is to be inserted, and an opening 4b, into which a spindle on the tape supply side (S side) is to be inserted. A structural part 10 for accommodating a lock member of a guard panel (not shown) is formed at a right upper corner of the bottom wall 2. Also, a structural part 11 for securing the guard panel to the magnetic tape cassette 1 is formed at the left upper corner of the bottom wall 2.

Figure 2:
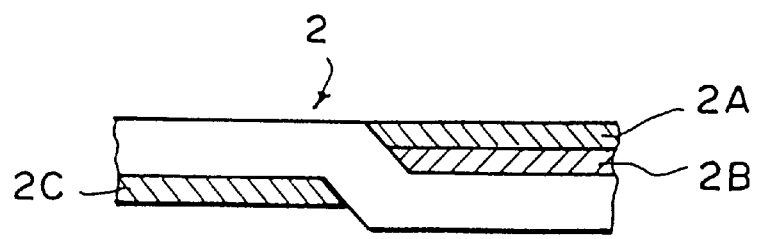
FIG. 2 is a sectional view taken along line I—I of FIG. 1.

The magnetic tape cassette 1 is of the thin-walled type, i.e., the thicknesses of the bottom wall 2 and the side wall 3 are smaller than the thicknesses of a bottom wall and a side wall of a conventional cassette. Specifically, as illustrated in FIG. 2 which is a sectional view taken along line I—I of FIG. 1, portions 2A, 2B, and 2C of the bottom wall 2 corresponding to the wall thickness of a conventional cassette are omitted, and the wall thicknesses of the magnetic tape cassette 1 are thereby reduced as a whole.

Figure 3:
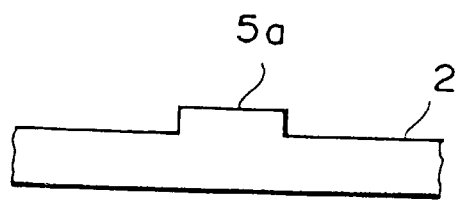
FIG. 3 is a sectional view taken along line II—II of FIG. 1.

The amount of the material required to make the magnetic tape cassette 1 can be decreased by reducing the wall thicknesses in the manner described above. However, heretofore, if the wall thicknesses of the magnetic tape cassette 1 are merely reduced, a resin having been fed into a mold for forming the magnetic tape cassette 1 cannot flow smoothly through the flow path in the mold, and therefore the short shot phenomenon will thereby occur. Specifically, when the resin having been fed from a position G of the magnetic tape cassette 1 into the mold, the resin cannot be sufficiently filled in the structural parts 10 and 11, which are located at positions remote from the position G. In the magnetic tape cassette 1 in accordance with the present invention, for the purposes of eliminating such problems, the bottom wall 2 is provided with flow path-like, thick-walled portions 5a and 5b at positions passing through the front sides of the openings 4a and 4b with respect to the magnetic tape cassette 1. The thick-walled portions 5a and 5b respectively extend along directions heading from the position G corresponding to the position, from which the resin is fed into the mold, towards the structural parts 10 and 11. As illustrated in FIG. 3 which is a sectional view taken along line II—II of FIG. 1, the thick-walled portions 5a and 5b are provided such that they are thicker than the bottom wall 2. The thicknesses of the thick-walled portions 5a and 5b are approximately 0.5 to 1 mm larger than the thickness of the bottom wall 2, and the widths of the thick-walled portions 5a and 5b are approximately 5 to 10 mm.

By the provision of the thick-walled portions 5a and 5b, the resin having been fed from a gate of the mold can pass through the thick-walled portions 5a and 5b and can reach the structural parts 10 and 11. Therefore, the resin can be sufficiently filled in the structural parts 10 and 11.

A second embodiment of the magnetic tape cassette in accordance with the present invention will be described hereinbelow.

Figure 4:
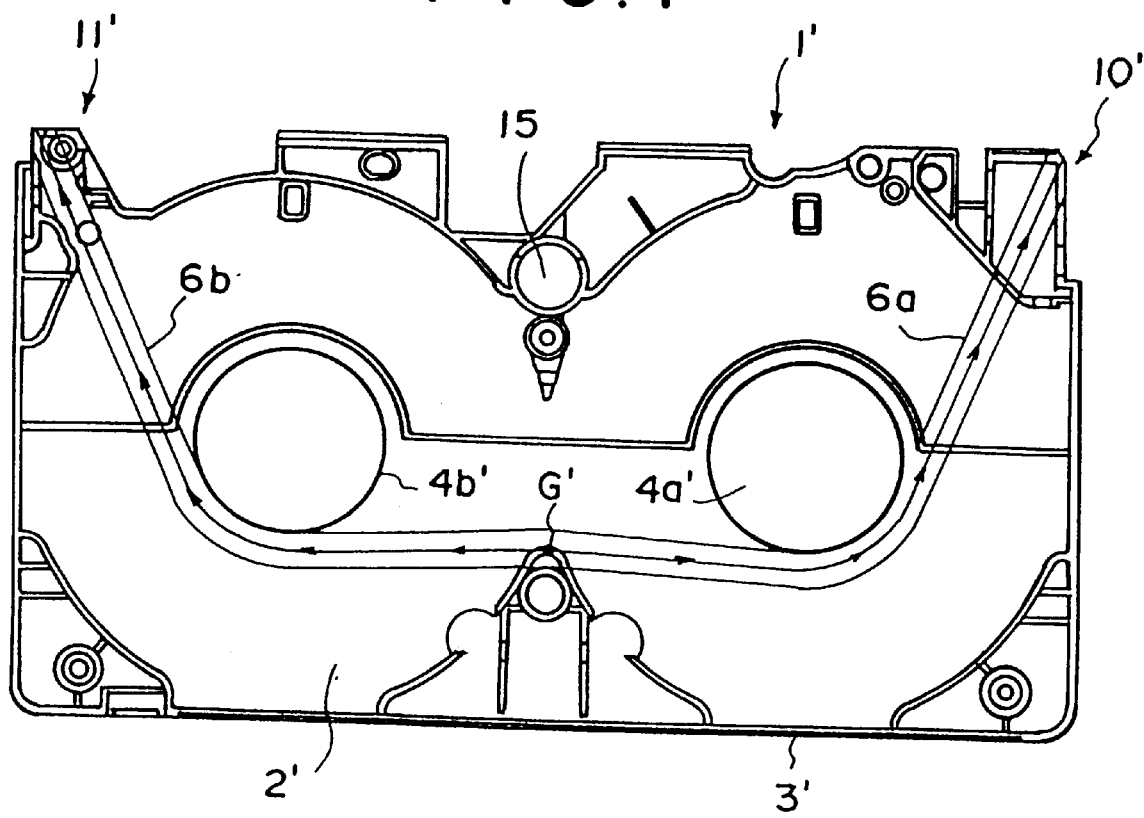
FIG. 4 is a plan view showing a second embodiment of the magnetic tape cassette in accordance with the present invention with its upper case being removed.

FIG. 4 is a plan view showing the second embodiment of the magnetic tape cassette in accordance with the present invention with its upper case being removed. The structure of a magnetic tape cassette 1' as the second embodiment is basically identical with the structure of the first embodiment of the magnetic tape cassette in accordance with the present invention. The second embodiment eliminates whitening and resin seizure phenomena, which occur at a peripheral area of a light source hole 15 of the magnetic tape cassette 1'. Specifically, a bottom wall 2' is provided with flow path-like, thick-walled portions 6a and 6b at positions passing through the rear sides of openings 4a' and 4b' with respect to the magnetic tape cassette 1'. The thick-walled portions 6a and 6b respectively extend along directions heading from a position G' corresponding to the position, from which the resin is fed into the mold, towards structural parts 10' and 11'. As a result, the resin can be filled in the structural parts 10' and 11' such that the whitening and resin seizure phenomena may not occur at the peripheral area of the light source hole 15.

A third embodiment of the magnetic tape cassette in accordance with the present invention will be described hereinbelow.

Figure 5:
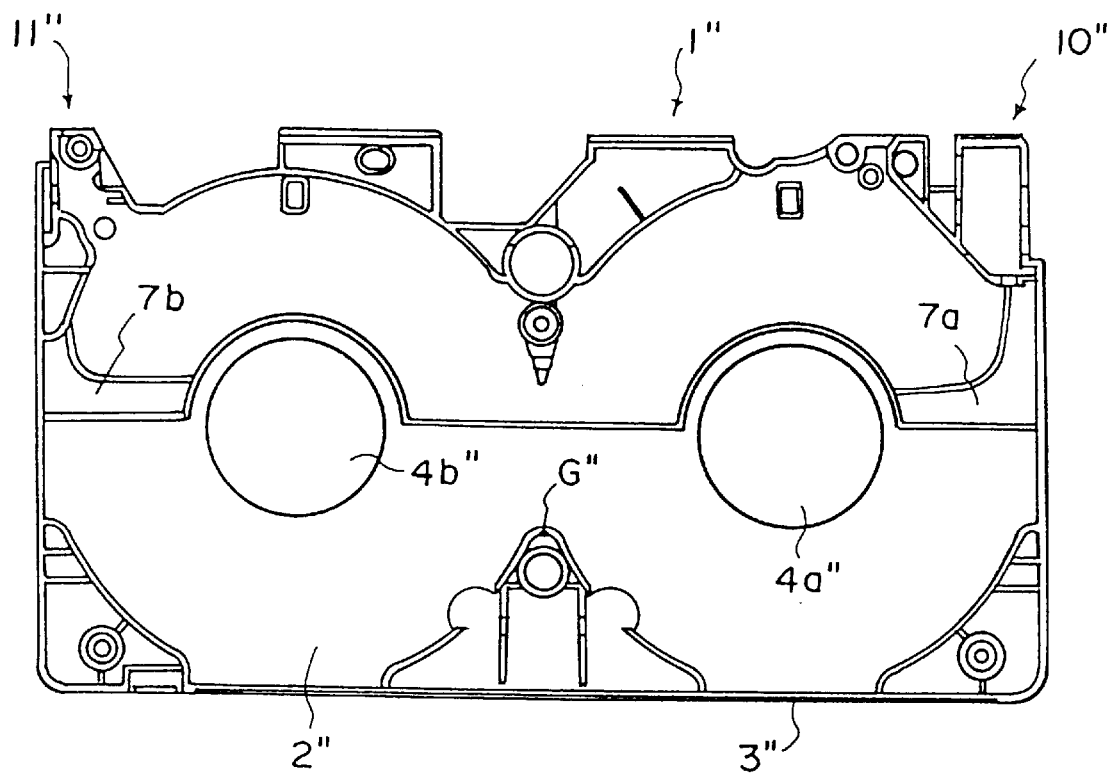
FIG. 5 is a plan view showing a third embodiment of the magnetic tape cassette in accordance with the present invention with its upper case being removed.

FIG. 5 is a plan view showing the third embodiment of the magnetic tape cassette in accordance with the present invention with its upper case being removed. The structure of a magnetic tape cassette 1" as the third embodiment is basically identical with the structure of the first embodiment of the magnetic tape cassette in accordance with the present invention. The third embodiment is applicable in cases where the thickness of a side wall 3" of the magnetic tape cassette 1" is larger than the thickness of a bottom wall 2". Specifically, the bottom wall 2" is provided with flow path-like, thick-walled portions 7a and 7b respectively extending from positions in the vicinity of openings 4a" and 4b" towards structural parts 10" and 11". With this embodiment, the thick-walled portions 7a and 7b respectively extend along directions heading from a position G" corresponding to the position, from which the resin is fed into the mold, towards the structural parts 10" and 11". As a result, the resin can be sufficiently filled in the structural parts 10" and 11".

Figure 6:
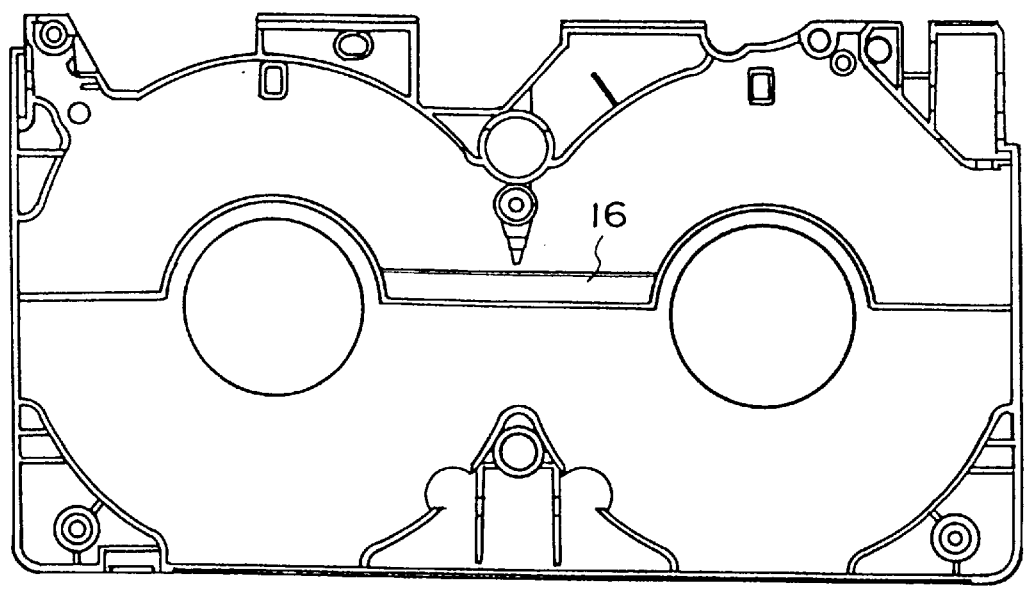
FIG. 6 is a plan view showing a preferable embodiment of the magnetic tape cassette in accordance with the present invention.

As illustrated in FIG. 6, in cases where the resin seizure phenomenon occurs frequently at the peripheral area of the light source hole 15, a recess 16, at which the wall thickness is smaller than the thickness of the bottom wall, may be formed. With such a structure, the pressure of the resin applied to the peripheral area of the light source hole 15 can be kept low, and the resin seizure phenomenon can be eliminated.

The magnetic tape cassette in accordance with the present invention is not limited to the above-described embodiments, and may be embodied in various other ways.

The aforesaid embodiments are concerned with magnetic tape cassettes for the VTR. The magnetic tape cassette in accordance with the present invention is also applicable to other magnetic tape cassettes, e.g., those for audio purposes, those for DAT, and those having a single hub.

What is claimed is:

1. A magnetic tape cassette comprising:

a bottom wall provided with a pair of openings which receive a pair of spindles;

a side wall extending along a periphery of the bottom wall; and structural parts formed integrally with the bottom wall at two front corner portions thereof and adjacent the side wall, wherein the magnetic tape cassette is of a thin walled type, the bottom wall, the side wall and the structural parts being integrally molded by feeding resin into a mold at a position corresponding to a gate point positioned around a central portion of the bottom wall;

wherein the bottom wall, being substantially flat, includes a thin walled portion and at least one, but no more than two, thick walled, flow path portions, each of the thick walled, flow path portions having a thickness of about 0.5 mm to about 1 mm larger than that of the thin walled portion such that the resin is efficiently extended to completely fill the structural part, said thick walled portions extending from a position in the vicinity of each opening toward each of the structural parts, said thick walled portions having a variable width; and wherein a thickness of said side wall is larger than a thickness of said bottom wall.

2. A magnetic tape cassette according to claim 1, wherein each of said thick walled portions is disposed between said openings and said structural parts.

3. A magnetic tape cassette as recited in claim 1, wherein said thick walled portions extend from said position in the vicinity of each opening toward said side wall, and along said side wall toward the structural parts.

4. A magnetic tape cassette as recited in claim 3, wherein the width of said thick walled portions along said side wall decreases in a direction approaching the structural parts.

* * * * *